United States Patent
Thalhofer et al.

(12)

(10) Patent No.: US 6,672,599 B2
(45) Date of Patent: Jan. 6, 2004

(54) STACKABLE SHOPPING CART

(75) Inventors: Armin Thalhofer, Günzburg (DE);
Markus Riesenegger, Bubesheim (DE);
Bernhard Maatz, Augsburg (DE);
Carsten Glogger, Krumbach (DE);
Gottfried Wanzl, Leipheim (DE)

(73) Assignee: Wanzl Metallwarenfabrik GmbH, Leipheim (DE)

( * ) Notice: Subject to any disclaimer, the term of this patent is extended or adjusted under 35 U.S.C. 154(b) by 8 days.

(21) Appl. No.: 10/077,848

(22) Filed: Feb. 20, 2002

(65) Prior Publication Data

US 2002/0074753 A1 Jun. 20, 2002

Related U.S. Application Data

(63) Continuation of application No. PCT/DE01/02607, filed on Jul. 11, 2001.

(30) Foreign Application Priority Data

Jul. 14, 2000 (DE) .......................................... 100 34 331
Jan. 18, 2001 (DE) .......................................... 101 02 118

(51) Int. Cl.⁷ ............................................... B62D 39/00
(52) U.S. Cl. ............................. 280/33.998; 280/33.991; 280/33.992
(58) Field of Search ....................... 280/33.991, 33.992, 280/33.995, 33.996, 33.997, DIG. 4

(56) References Cited

U.S. PATENT DOCUMENTS

| | | | | |
|---|---|---|---|---|
| 2,689,134 A | * | 9/1954 | Lachance | 280/33.997 |
| 2,903,269 A | * | 9/1959 | Hennion | 280/33.995 |
| 3,361,438 A | * | 1/1968 | Davis | 280/33.991 |
| 3,999,774 A | * | 12/1976 | Rehrig | 280/33.991 |
| 4,097,056 A | * | 6/1978 | Castellano | 280/33.991 |
| 4,362,411 A | * | 12/1982 | Asberg | 403/5 |
| 4,616,839 A | * | 10/1986 | Trubiano | 280/33.991 |
| 4,865,338 A | * | 9/1989 | Rehrig | 280/33.992 |
| 5,203,579 A | | 4/1993 | Lipschitz | |
| 5,289,936 A | * | 3/1994 | Jones et al. | 220/4.28 |
| 5,401,042 A | * | 3/1995 | Ruger | 280/33.997 |
| 5,441,288 A | * | 8/1995 | Rehrig | 280/33.991 |
| 5,470,087 A | * | 11/1995 | Mainard et al. | 280/33.992 |
| 5,794,952 A | * | 8/1998 | Kern et al. | 280/33.991 |
| 5,961,133 A | * | 10/1999 | Perry | 280/33.993 |
| 2002/0074753 A1 | * | 6/2002 | Thalhofer et al. | 280/33.998 |

FOREIGN PATENT DOCUMENTS

| | | | |
|---|---|---|---|
| FR | 2470720 | 6/1981 | |
| GB | 2316368 | 2/1998 | |
| WO | WO 9604161 A1 * | 2/1996 | B62B/3/14 |

* cited by examiner

Primary Examiner—Brian L. Johnson
Assistant Examiner—Kelly E Campbell
(74) Attorney, Agent, or Firm—Burns, Doane, Swecker & Mathis, L.L.P.

(57) ABSTRACT

A stackable shopping cart (1) has a rolling frame (2), a basket (8), a pushing device (19), and a wall (10) that can be swiveled into the inside of the basket, through which wall the back (9) of the basket (8) can be closed, whereby two upwardly directed carriers (6) are positioned on the back end of the rolling frame (2), and the basket (8) is provided at its back (9) with support elements (13) that form a push-on connection with the carriers (6). The support elements (13) are formed by hollow receptacles (14) and the carriers (6) extend upwardly beyond the receptacles (14), and that the sections (7) of the carriers (6) located above the receptacles (14) are intended for the attachment of the pushing device (19).

18 Claims, 3 Drawing Sheets

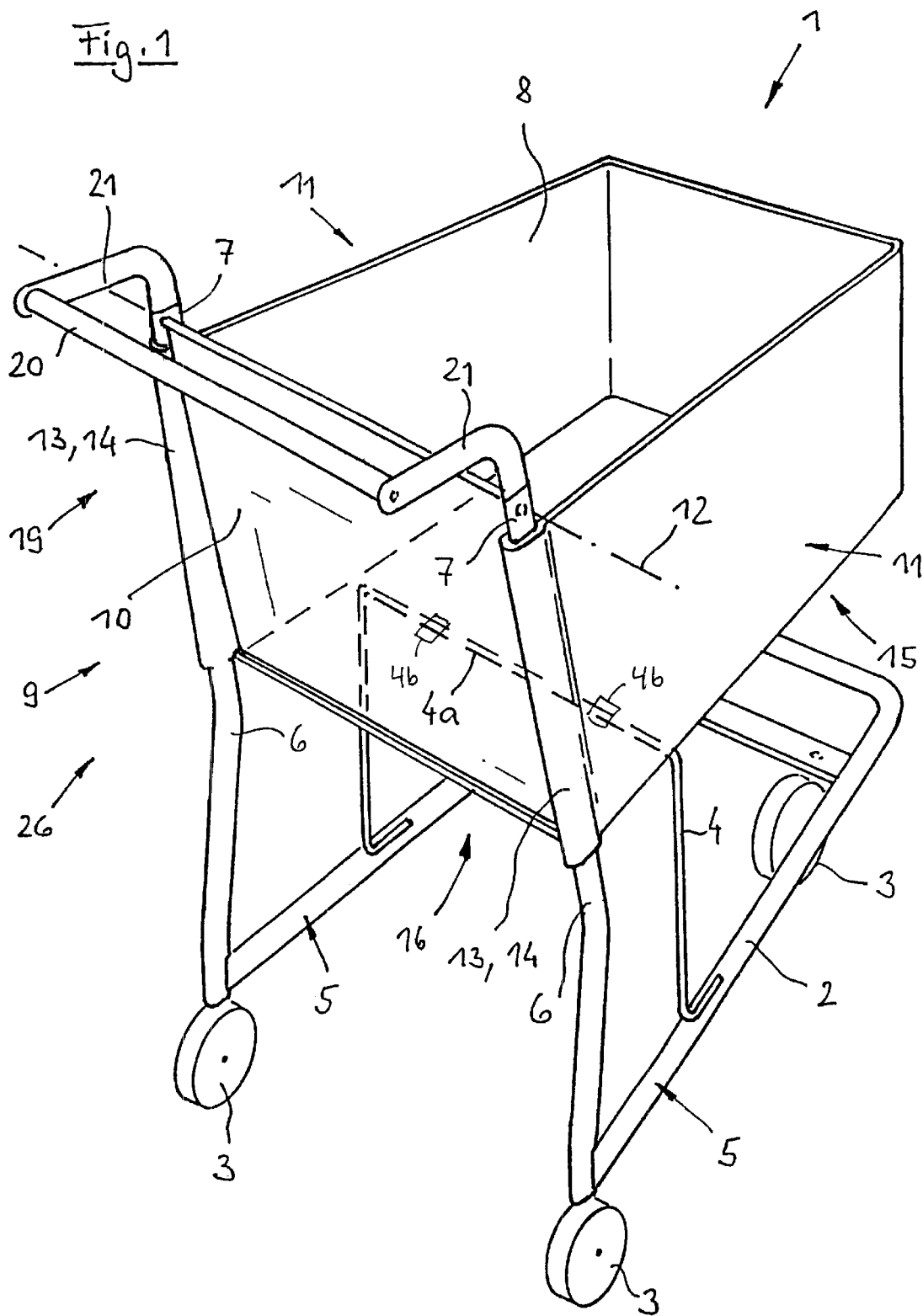

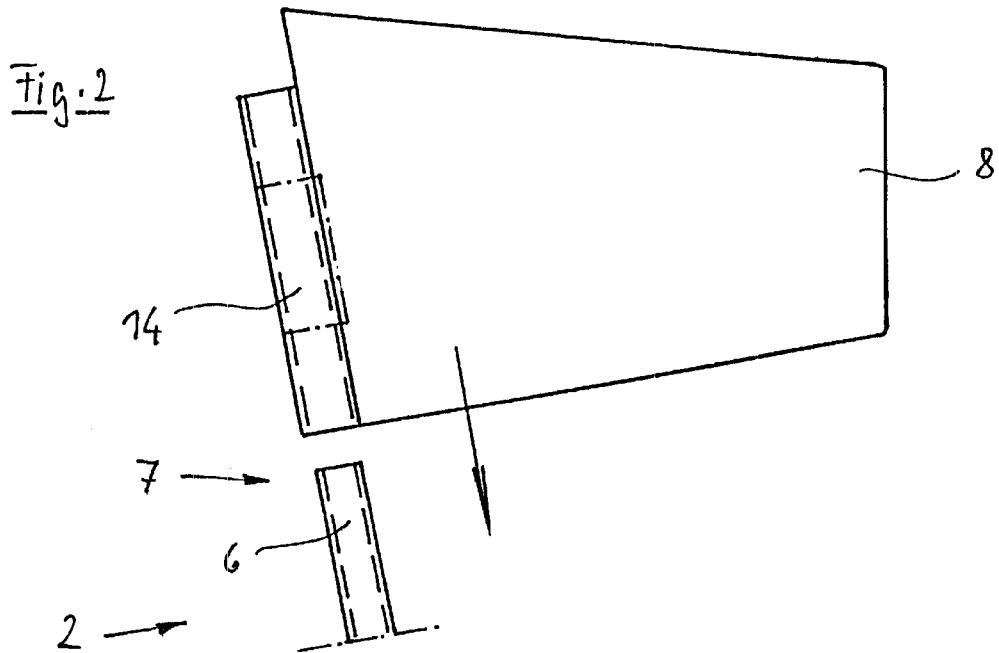
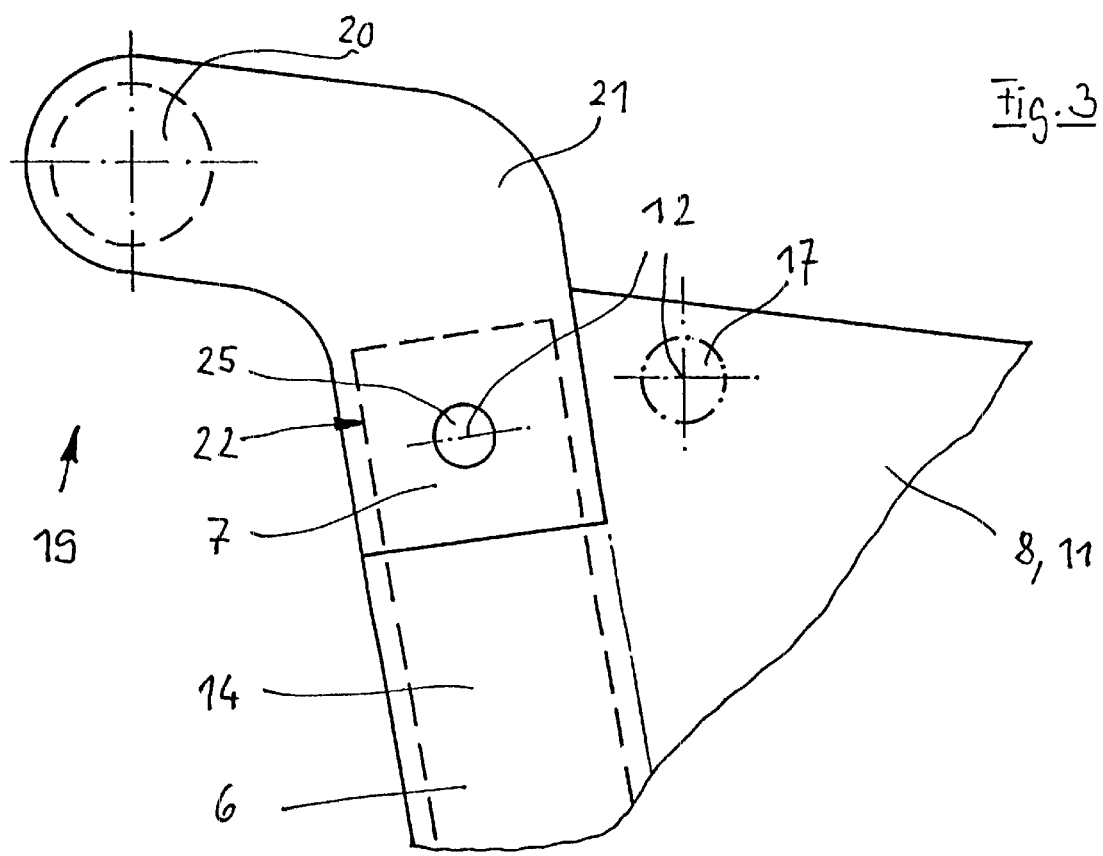

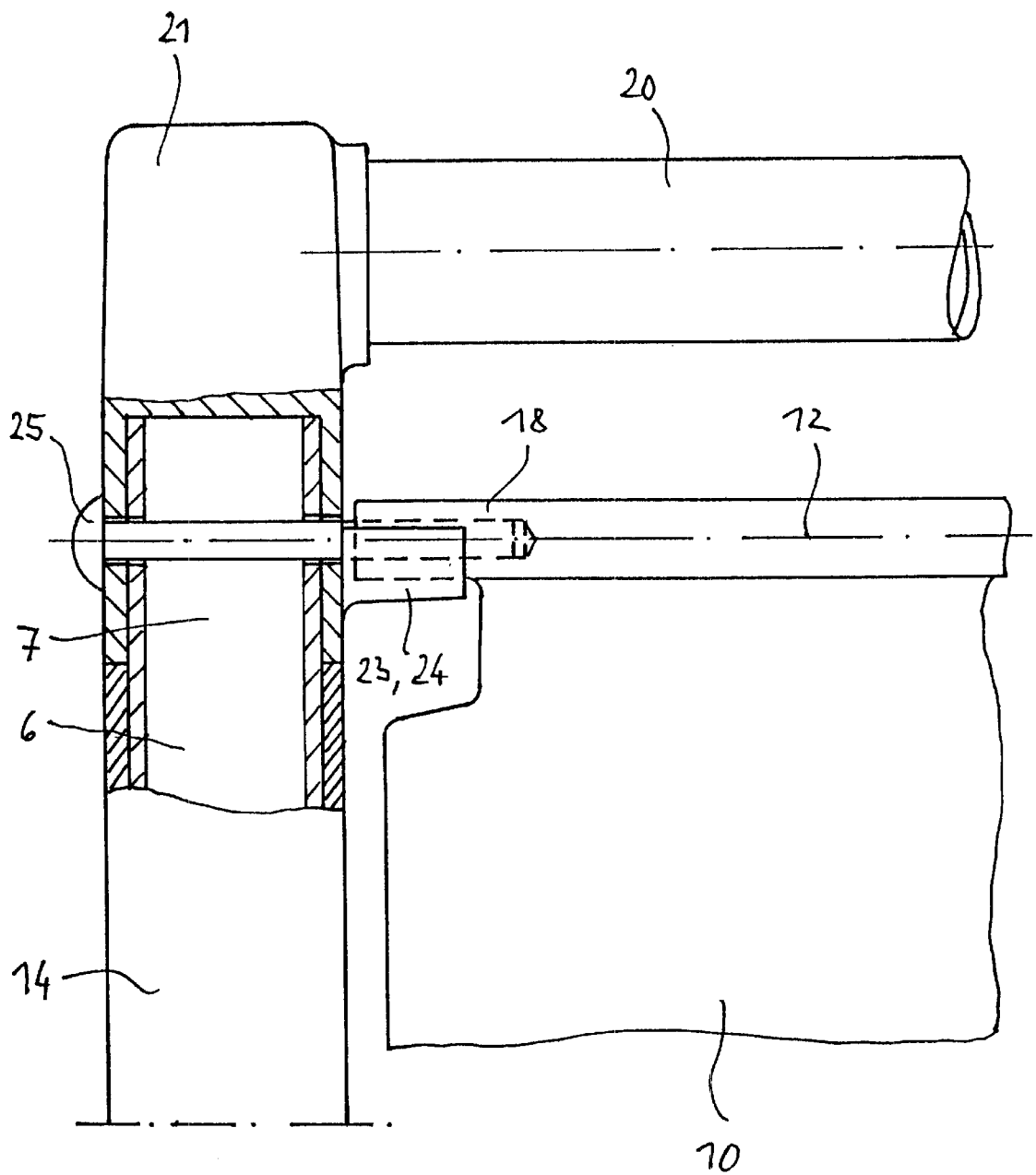

STACKABLE SHOPPING CART

CROSS-REFERENCE TO RELATED APPLICATIONS

The present application is a continuation of PCT/DE01/02607, filed Jul. 11, 2001, which was published in German as WO 02/06107, on Jan. 24, 2002. The present application also claims priority of German Patent Application Nos. 100 34 331.7 and 101 02 118.6, filed in Germany on Jul. 14, 2000 and Jan. 18, 2001, respectively. The entire contents of all three applications are hereby incorporated herein by reference.

BACKGROUND OF THE INVENTION

1. Field of the Invention

The invention relates to a stackable shopping cart having a rolling frame, a pushing device, and a wall that can be swiveled into the inside of the basket, through which wall the back of the basket can be closed, whereby two upwardly directed carriers are positioned on the back end of the rolling frame, and the basket is provided at its back with supports that form a push-on connection with the carriers.

2. Description of Related Art

The state of the art includes a shopping cart described in U.S. Pat. No. 4,097,056. This shopping cart is provided with two carriers made from tubes that are positioned so as to be oriented upwards at the back of a rolling frame. At the back of the basket, supports are provided on both sides, said supports being designed as downward oriented tube sections, extending downward beyond the bottom of the basket, and being inserted into the tubular carriers so as to produce a push-on connection between the rolling frame and the basket.

OBJECTS AND SUMMARY

It is an object of the invention to further develop a shopping cart in such that, if the basket is manufactured from plastic, a safe and nonshaking push-on connection between the rolling frame and the basket can be made, so as to enable a stable arrangement of the pushing device on the shopping cart.

This objective can be realized if the supports on the basket are formed by hollow receptacles, into which the carriers of the rolling frame can be inserted, whereby the carriers extend upwardly beyond the receptacles, and the sections of the carriers located above the receptacles are intended for the attachment of the pushing device.

It is found to be extremely useful to extend the carriers upwardly beyond the receptacles. This makes it possible to construct and arrange the receptacles sufficiently large or, respectively, also in spaced-apart pairs so that a nonshaking and secure connection of the basket with the rolling frame can be achieved. In addition, the two free sections of the carriers located above the receptacles are excellently suited to attach the pushing device in a simple and also secure manner directly to the tubular carriers manufactured from steel.

And finally, it is also possible according to another aspect of the invention, to position the wall at the back of the basket so that it can be swiveled on the sections of the carriers positioned above the receptacles, so that the wall, if it is further developed so as to form a child seat device, also can be attached to the shopping cart in a safe and stable manner.

BRIEF DESCRIPTION OF THE DRAWINGS

The invention is explained in more detail in reference to exemplary embodiments. In the drawings:

FIG. 1 illustrates a completely assembled shopping cart.

FIG. 2 illustrates the process of setting a basket onto two carriers of the rolling frame.

FIG. 3 illustrates a lateral view of the type of attachment of the pushing device.

FIG. 4 illustrates the attachment of the wall that forms the back of the basket.

DETAILED DESCRIPTION OF THE PREFERRED EMBODIMENTS

One embodiment of the present invention is the shopping cart 1 shown essentially schematically in FIG. 1, and which has a rolling frame 2 made from metal, and which carries a basket 8 made from plastic or mostly from plastic. The shopping cart 1 is provided with a pushing device 19 located on the back 26 of the shopping cart. The back 9 of the basket 8 is mostly formed by a wall 10 that can be swiveled in a known manner around a top, horizontal axis 12 into the basket interior and back. The wall 10 also may be further developed into a folding child's seat in an also known manner. The shopping cart 1 is also designed in a known manner so that it can be stacked in a row in a space-saving manner with other identical shopping carts 1. In the preferred embodiment, the basket 8 and the wall 10 are made from plastic. However, alternative materials known to those of skill in the art could be used.

On the back 9 of the basket 8 and on each of its two longitudinal side walls 11 are located a hollow receptacle 14 provided as support 13, into each of which hollow receptacles an upwardly directed carrier 6, belonging to the rolling frame 2, is inserted in such a way that a push-on connection is formed between the carriers 6 and the supports 13. The carriers 6 extend upwardly beyond the top of the receptacles 14 so that two sections 7 of the carriers 6 are located above the receptacles 14. The sections 7 carry the already mentioned pushing device 19 that is formed by a handle bar 20 and two holding elements 21 that carry the handle bar 20. The handle bar 20 is preferably connected with the sections 7 of the carriers 6 in a stationary yet releasable manner.

The carriers 6 are part of the rolling frame 2 that is equipped with rolling casters 3, whereby the carriers 6 and therefore most of the rolling frame 2 are preferably made from semi-circular tube, and the cross-section of the receptacles 14 is adapted to the cross-section of the carriers 6. Instead of the semi-circular tube, a conventional circular tube also can be used. It is advisable to also support the basket 8 additionally with its bottom 15 on a support brace 4 that, for example, connects two longitudinal sections 5 of the rolling frame 2. For this purpose, fasteners 4b provided, for example, with undercuts are molded to the underside 16 of the basket 8, which fasteners surround the horizontal section 4a of the support braces 4 like a clamp.

In a lateral view, FIG. 2 shows how the basket 8 is pushed from the top onto the two carriers 6 of the rolling frame 2. The arrow shows the push-on direction. The drawing does not show the pushing device 19. During the pushing-on process, the carriers 6 penetrate into the receptacles 14 to such an extent that the sections 7 of the carriers 6 are located above the two receptacles 14 in the final, pushed-on state of the basket 8. It is hereby naturally possible to provide, instead of only one receptacle 14, for example, two receptacles 14 for each carrier 6. In the drawing, such a design is suggested by the dot-slashed lines.

FIG. 3 shows a lateral view of an excerpt of part of a longitudinal wall 11 of the basket 8 with part of a carrier 6 as well as a holding element 21 of the pushing device 19. The carrier 6 extends upwards beyond the receptacle 14 and ends with its section 7 in a pocket 22 located on the holding element 21 and which is open towards the bottom. The just described arrangement in each case is located at the two longitudinal walls 11 of the basket 8. The two holding elements 21 that carry the handle bar 20 are therefore pushed from the top onto the sections 7 of the carriers 6 and are secured against becoming loose by a securing element 25, which in each case passes at least in part through the holding element 21, as well as the corresponding carrier 6. In the drawing, a slash-dotted circle suggests that a bearing 17 can be molded on to the inside of the longitudinal walls 11, the bearings being positioned on the horizontal axis 12 and are intended for carrying the swiveling wall 10.

According to another embodiment of the invention, as shown in FIG. 4, it is possible to use the securing elements 25 for attaching the holding elements 21 and for attaching the swiveling wall 10. The drawing illustrates part of a receptacle 14, part of a carrier 6 passed through the receptacle 14, whose section 7 ends in a holding element 21, and part of the handle bar 20 supported by the holding elements 21. On the horizontal axis 12, a securing element 25 is provided that passes through the holding element 21 and the carrier 6, which securing element 25 is passed through a bearing part 23 located on the inside of the holding element 21 and is screwed into a cylindrical carrying section 18 or is secured in another suitable manner, whereby the carrying section 18 is part of the wall 10. The carrying section 18 of the wall 10, and therefore the wall itself, extends to the opposite holding element 21 and is positioned in the bearing part 23 of the opposite holding element 21. The bearing part is arranged in a mirror-symmetrical manner so as to be swivelable around the horizontal axis 12, and is secured in the same manner by the securing element 25 against becoming loose.

Instead of two securing elements 25, a cylindrical shaft originating from one holding element 21 and extending to the opposite holding element 21 and thereby passing through the holding elements 21, carriers 6, bearing parts 23 and the carrying section 18 of the wall 10 may be provided. Securing elements at the ends of the shaft fix the shaft in the just described position. It is advantageous to design the bearing parts 23 as hollow, cylindrical projections whose cylindrical wall 24 has been slitted longitudinally to such an extent that the wall 10 can be inserted by means of the carrying section 18 from the top so as to snap tightly into the bearing parts 23. This facilitates the assembly of the wall 10 extraordinarily. After the application of the one or more securing elements 25 in the previously described manner, the wall 10 is no longer able to become loose from the bearing parts 23 and therefore form the holding parts 21, since the at least one securing elements 25 also is passed through the carriers 6.

While the present invention has been described by reference to the above-mentioned embodiments, certain modifications and variations will be evident to those or ordinary skill in the art. Therefore, the present invention is limited only by the scope and spirit of the appended claims, and equivalents thereof.

What is claimed is:

1. A stackable shopping cart comprising:
   a rolling frame having a back end,
   a basket having a back end,
   a pushing device,
   a wall that can be swiveled into the inside of the basket, through which wall, a back of the basket can be closed,
   the rolling frame includes two upwardly directed carriers positioned on the back end of the rolling frame,
   the basket is provided at its back with supports that form a connection with the carriers,
   the supports are formed by hollow receptacles and the carriers extend upwardly beyond the receptacles so that sections of the carriers extend above the receptacles, and
   the pushing device is attached to sections of the carriers above the receptacles.

2. The shopping cart according to claim 1, wherein the basket can be pushed from above onto the carriers.

3. The shopping cart according to claim 1, wherein the receptacles are arranged on the back of the basket and on longitudinal walls of the basket.

4. The shopping cart according to claim 1, wherein the pushing device has two holding elements that are connected with the sections of the carriers in a stationary yet releasable manner.

5. The shopping cart according to claim 4, wherein each of the holding elements includes a pocket, and each of the sections of the carriers is inserted in a respective one of the pockets.

6. The shopping cart according to claim 4, wherein each of the holding elements includes a bearing part and the wall is positioned in a swivelable manner in the bearing parts.

7. The shopping cart according to claim 4, wherein the wall is inserted so as to snap tightly into the holding elements.

8. The shopping cart as claimed in claim 1, further comprising a fastener on an underside of the basket with which fastener the basket additionally is supported on the rolling frame and connected to the rolling frame.

9. The shopping cart according to claim 1, wherein two receptacles are provided for each of the carriers.

10. The shopping cart according to claim 1, further comprising securing elements for the attachment of the pushing device to the sections, and the securing elements also secure and attach the wall.

11. The shopping cart according to claim 1, wherein the supports form a push-on connection with the carriers.

12. A stackable shopping cart comprising:
    a rolling frame having a back end,
    a basket having a back end,
    a pushing device,
    a wall that can be swiveled into the inside of the basket, through which wall, a back of the basket can be closed,
    the rolling frame includes two upwardly directed carriers extending from the back end of the rolling frame,
    the basket is provided at its back with supports that form a connection to the carriers, the carriers extend upwardly through the supports and beyond the supports so that sections of the carriers extend above a top of the supports, and
    the pushing device is attached to the sections of the carriers above a top of the supports.

13. The stackable shopping cart of claim 12, wherein the pushing device includes a holding element at each end thereof, and the holding elements connect to the carriers in a stationary and releasable manner.

14. The shopping cart according to claim 13, wherein each of the holding elements includes a pocket, and each of the sections of the carriers is inserted in a respective one of the pockets.

15. The shopping cart according to claim 13, wherein each of the holding elements includes a bearing part and the wall is positioned in a swivelable manner in the bearing parts.

16. A method of assembling a stackable shopping cart, the method comprising:
   providing a rolling frame having a back end which includes at least two upwardly directed carriers positioned on the back end of the rolling frame,
   connecting a basket having hollow receptacles at a back end of the basket to the rolling frame by pushing the hollow receptacles onto the upwardly directed carriers so that the carriers extend upwardly through the receptacles until sections of the carriers extend above a top of the receptacles, and
   connecting a pushing device to the sections of the carriers that extend above the receptacles.

17. The method of claim 16, further comprising attaching a wall that can be swivelled into the inside of the basket to a top of the basket.

18. The method of claim 16, further comprising attaching a wall that can be swivelled into the inside of the basket to the sections of the carriers that extend above the receptacles.

* * * * *